(12) United States Patent
Kojima et al.

(10) Patent No.: US 12,463,712 B2
(45) Date of Patent: Nov. 4, 2025

(54) RELAY APPARATUS AND RELAY METHOD

(71) Applicant: NTT, Inc., Tokyo (JP)

(72) Inventors: Yasuyoshi Kojima, Musashino (JP);
Kiyohiko Itokawa, Musashino (JP);
Daisuke Goto, Musashino (JP);
Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 246 days.

(21) Appl. No.: 18/266,979

(22) PCT Filed: Dec. 25, 2020

(86) PCT No.: PCT/JP2020/048782
§ 371 (c)(1),
(2) Date: Jun. 13, 2023

(87) PCT Pub. No.: WO2022/137518
PCT Pub. Date: Jun. 30, 2022

(65) Prior Publication Data
US 2024/0056172 A1 Feb. 15, 2024

(51) Int. Cl.
*H04B 7/204* (2006.01)
*H04B 1/69* (2011.01)
*H04B 7/185* (2006.01)

(52) U.S. Cl.
CPC .......... *H04B 7/18513* (2013.01); *H04B 1/69* (2013.01)

(58) Field of Classification Search
CPC ...... H04B 7/18513; H04B 1/69; H04B 7/155; H04B 7/185; H04B 7/18582; H04B 7/18508; H04B 7/18584; H04B 7/2041; H04H 40/90
See application file for complete search history.

(56) References Cited

U.S. PATENT DOCUMENTS

| | | |
|---|---|---|
| 9,118,455 B2 | 8/2015 | Agarwal |
| 2015/0109992 A1* | 4/2015 | Li .................. H04B 7/026 370/315 |
| 2020/0177272 A1 | 6/2020 | Gedmark et al. |
| 2021/0266062 A1* | 8/2021 | Goto .................. H04B 7/18513 |

OTHER PUBLICATIONS

Wei Feng et al., UAV-Aided MIMO Communications for 5G Internet of Things, IEEE Internet of Things Journal, vol. 6, No. 2, Apr. 2019, pp. 1731-1740.
International Search Report issued in PCT/JP2020/048782 mailed on Apr. 13, 2021.
"Adopted a technology demonstration plan as an innovative satellite technology demonstration theme to realize '20 Gbps super-communication between low earth orbit satellites and the ground, and ultra-wide area IoT data collection', -In-orbit demonstration of the world's first low earth orbit satellite MIMO technology, etc.- ", NTT Press Release, May 29, 2020, pp. 1-2.

* cited by examiner

*Primary Examiner* — Phuongchau Ba Nguyen

(57) ABSTRACT

A receiving unit receives a signal from a transmission terminal. A capacity specifying unit specifies a channel capacity related to wireless communication with a base station. A data generation unit generates waveform data representing the received signal. A data size of the waveform data increases as the channel capacity increases. A transmission unit transmits the waveform data to the base station.

5 Claims, 4 Drawing Sheets

RELAY APPARATUS AND RELAY METHOD

CROSS-REFERENCE TO RELATED APPLICATIONS

This application is a 371 National Stage of International Application No. PCT/JP2020/048782, filed on Dec. 25, 2020. The entire disclosure of the above application is incorporated herein by reference.

TECHNICAL FIELD

The present invention relates to a relay device (a relay apparatus) and a relay method.

BACKGROUND ART

With the development of Internet of Things (IoT) technology, it has been studied to install IoT terminals including various sensors in various places. For example, it is also assumed that the IoT is used to collect data of a place where it is difficult to install a base station, such as a buoy or a ship on the sea or a mountainous area. Meanwhile, there is a technology of wirelessly communicating with a communication device on the ground by using an unmanned aerial vehicle (UAV) or a geosynchronous satellite (see, for example, Non Patent Literature 1).

CITATION LIST

Non Patent Literature

Non Patent Literature 1: Wei Feng, et al. "UAV-aided MIMO communications for 5G Internet of Things", IEEE Internet of Things Journal, Volume 6, Issue 2, 2019, pp. 1731-1740

SUMMARY OF INVENTION

Technical Problem

In a case where a relay device is mounted on a UAV, a geosynchronous satellite, or the like, a channel capacity related to wireless communication between the relay device and a base station changes as the relay device moves. Therefore, depending on a timing of the communication, an amount of information may be small with respect to the channel capacity, and thus communication resources may not be effectively used. Meanwhile, depending on the timing of the communication, the amount of information may be large with respect to the channel capacity, and thus data received by the base station may be missing.

In view of the above circumstances, an object of the present invention is to provide a relay device that performs communication while moving and a relay method, whereby the relay device can effectively use communication resources while preventing missing of received data.

Solution to Problem

One aspect of the present invention is a relay device that performs communication while moving, the relay device including: a receiving unit that receives a signal from a transmission terminal; a capacity specifying unit that specifies a channel capacity related to wireless communication with a base station; a data generation unit that generates waveform data representing the received signal such that a data size of the waveform data increases as the channel capacity increases; and a transmission unit that transmits the waveform data to the base station.

One aspect of the present invention is a relay method including: a step of causing a relay device that performs communication while moving to receive a signal from a transmission terminal; a step of causing the relay device to specify a channel capacity related to wireless communication with a base station; a step of causing the relay device to generate waveform data representing the received signal such that a data size of the waveform data increases as the channel capacity increases; and a step of causing the relay device to transmit the waveform data to the base station via the second antenna.

Advantageous Effects of Invention

According to the present invention, a relay device that performs communication while moving can effectively use communication resources while preventing missing of received data.

DESCRIPTION OF EMBODIMENTS

Hereinafter, embodiments of the present invention will be described in detail with reference to the drawings.

First Embodiment

Figure 1:
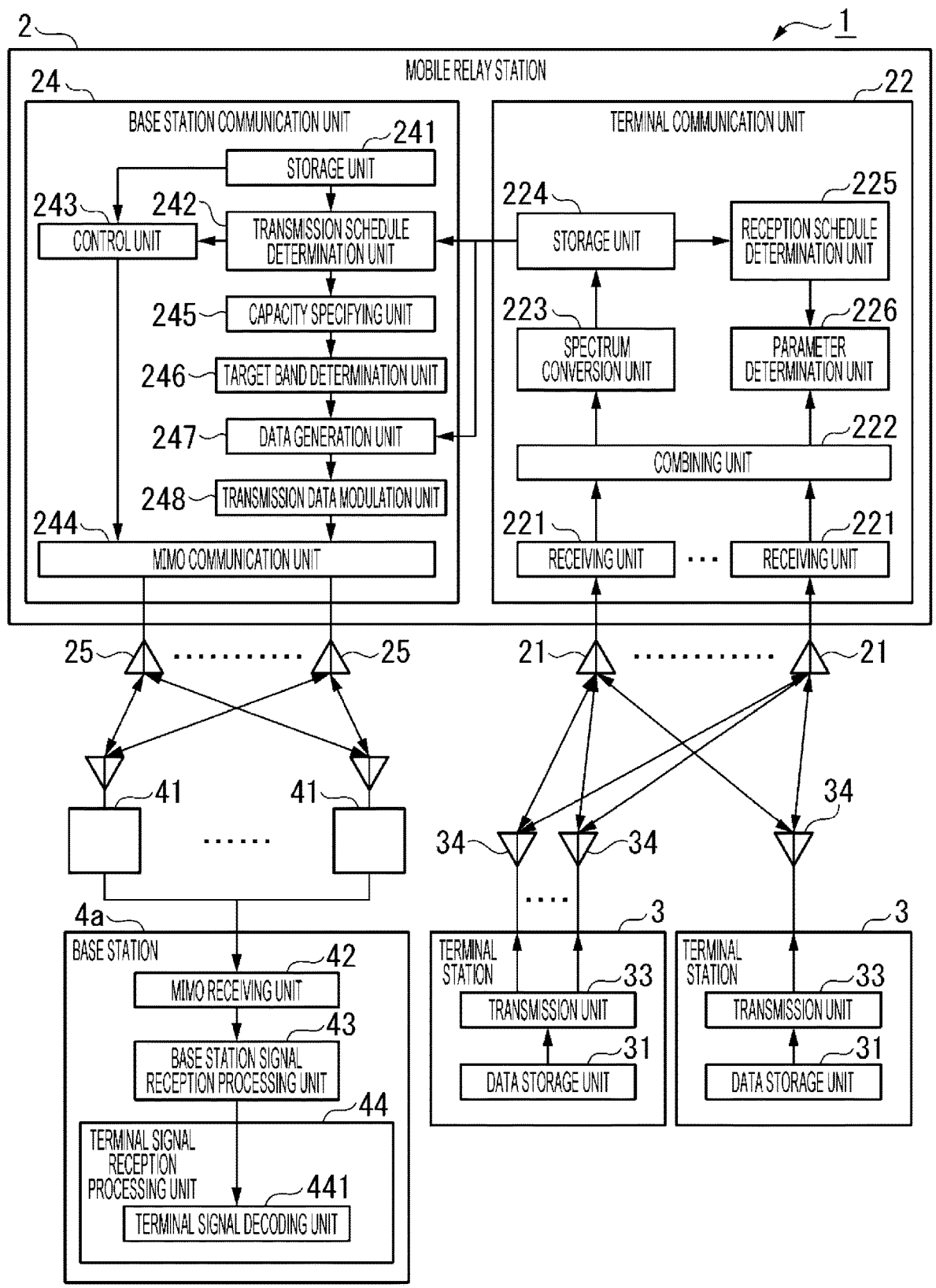
FIG. 1 is a configuration diagram of a wireless communication system according to a first embodiment.

FIG. 1 is a configuration diagram of a wireless communication system 1 according to a first embodiment. The wireless communication system 1 includes a mobile relay station 2, terminal stations 3, and a base station 4. The numbers of mobile relay stations 2, terminal stations 3, and base stations 4 included in the wireless communication system 1 each are arbitrary, but it is assumed that there is a large number of terminal stations 3.

The mobile relay station 2 is an example of a relay device that is mounted on a moving body and whose communicable area moves with the lapse of time. The mobile relay station 2 is provided in, for example, a low earth orbit (LEO) satellite. The LEO satellite has an altitude of 2000 km or less and moves around the earth once every about 1.5 hours. The terminal stations 3 and the base station 4 are installed on the earth, for example, on the ground or on the sea. The terminal stations 3 are, for example, IoT terminals. Each terminal station 3 collects data such as environmental data detected by a sensor and wirelessly transmits the collected data to the mobile relay station 2. FIG. 1 illustrates only two terminal stations 3. The mobile relay station 2 receives the data transmitted from each of the plurality of terminal stations 3 via wireless signals while moving above the earth and wirelessly transmits the received data to the base station 4. The base station 4 receives the data collected by the terminal stations 3 from the mobile relay station 2.

The mobile relay station 2 may be, for example, a relay station mounted on an unmanned aerial vehicle such as a geosynchronous satellite, drone, or high altitude platform station (HAPS). However, a relay station mounted on a geosynchronous satellite has a wide coverage area (footprint) on the ground, but has an extremely small link budget with respect to IoT terminals installed on the ground because its altitude is high. Meanwhile, a relay station mounted on a drone or HAPS has a high link budget, but has a narrow coverage area. Further, the drone needs a battery, and the HAPS needs a solar panel. In the present embodiment, the mobile relay station 2 is mounted on the LEO satellite. Thus, the link budget falls within a limit, and, in addition, the LEO satellite has no air resistance and has low fuel consumption because the LEO satellite moves around the outside of the atmosphere. Further, the footprint is large, as compared with a case where the relay station is mounted on the drone or HAPS.

However, the mobile relay station 2 mounted on the LEO performs communication while moving at a high speed, and thus a Doppler shift occurs in wireless signals. Further, the relay station mounted on the LEO has a smaller link budget than the relay station mounted on the drone or HAPS. Therefore, the mobile relay station 2 receives wireless signals from the terminal stations 3 through a plurality of antennas and transmits the wireless signals to the base station 4 through a plurality of antennas. Communication quality can be improved by a diversity effect and beamforming effect of communication using the plurality of antennas. In the present embodiment, there will be described an example where the mobile relay station 2 relays wireless signals received from the terminal stations 3 through the plurality of antennas to the base station 4 by multiple input multiple output (MIMO). Note that the wireless signals may be relayed to the base station 4 by a method other than MIMO.

A configuration of each device will be described.

The mobile relay station 2 includes a plurality of first antennas 21, a terminal communication unit 22, a base station communication unit 24, and a plurality of second antennas 25. The terminal communication unit 22 includes a plurality of receiving units 221, a combining unit 222, a spectrum conversion unit 223, a storage unit 224, a reception schedule determination unit 225, and a parameter determination unit 226. The plurality of receiving units 221 are provided corresponding to the plurality of first antennas 21. Each receiving unit 221 receives a signal via the corresponding first antenna 21. The combining unit 222 combines the signals received by the plurality of receiving units 221 according to a combination parameter. The combining unit 222 reproduces terminal uplink signals by combining the signals. The combination parameter is represented by, for example, an offset of a phase and amplitude of each first antenna 21.

The spectrum conversion unit 223 converts the signal combined by the combining unit 222 into a frequency spectrum. The spectrum conversion unit 223 obtains a frequency spectrum of the received signal by fast Fourier transform (FFT), for example. The spectrum conversion unit 223 records spectral data representing the generated frequency spectrum in the storage unit 224. The spectral data is represented by a combination of a frequency and power of the frequency.

The storage unit 224 stores position data of the terminal stations 3 and orbit data of the LEO satellite. The position data of the terminal stations 3 is represented by, for example, latitude and longitude. The orbit data of the LEO is data from which a position, speed, moving direction, and the like of the LEO satellite at an arbitrary time can be obtained. The storage unit 224 stores the spectral data of the terminal uplink signals.

The reception schedule determination unit 225 specifies a timing at which a signal is received from each terminal station 3 on the basis of the position data of the terminal stations 3 and the orbit data stored in the storage unit 224. The parameter determination unit 226 calculates the combination parameter for each time on the basis of the reception timing of signals determined by the reception schedule determination unit 225 and a positional relationship at the reception timing between the mobile relay station 2 and the terminal stations 3 with which the mobile relay station communicates. Note that the combination parameter for each time may be calculated in advance, or the combination parameter may be always constant.

The base station communication unit 24 transmits waveform data representing waveforms of the terminal uplink signals received by the terminal communication unit 22 to the base station 4 by MIMO. The base station communication unit 24 includes a storage unit 241, a transmission schedule determination unit 242, a control unit 243, a MIMO communication unit 244, a capacity specifying unit 245, a target band determination unit 246, a data generation unit 247, and a transmission data modulation unit 248. The storage unit 241 stores a communication time period with the base station 4 obtained in advance based on a position of the base station 4 and an orbit of the LEO satellite. The storage unit 241 further stores in advance a weight of a base station downlink signal transmitted from each second antenna 25 for each transmission time in the communication time period. The transmission time may be represented by, for example, a time elapsed from a transmission start timing. The weight for each transmission time is calculated based on the orbit data of the LEO satellite and a position of each antenna station 41.

The transmission schedule determination unit 242 determines a transmission time period for each piece of the waveform data corresponding to the spectral data on the basis of the number of pieces of the spectral data stored in the storage unit 224 and the communication time period. For example, the transmission schedule determination unit 242 determines a transmission time of each piece of the waveform data by dividing the length of the communication time period by the number of pieces of the spectral data and determines the transmission time period of each piece of the waveform data by separating the communication time period by the transmission time.

The control unit 243 issues an instruction on the weight for each transmission time read from the storage unit 241 to the MIMO communication unit 244. The MIMO communication unit 244 establishes MIMO communication with the base station 4 according to a predetermined protocol.

The capacity specifying unit 245 specifies a channel capacity in the communication with the base station 4 at the transmission start timing of each piece of the waveform data determined by the transmission schedule determination unit 242. For example, the capacity specifying unit 245 can obtain the channel capacity on the basis of an error rate of signals to be received by the MIMO communication unit 244. For example, the capacity specifying unit 245 may receive a control signal including a value of the channel capacity from the base station 4.

The target band determination unit 246 determines a target band that is a sampling target frequency band among the pieces of the spectral data stored in the storage unit 224 on the basis of the channel capacity specified by the capacity specifying unit 245. The target band determination unit 246 widens the target band as the channel capacity increases. Meanwhile, the target band determination unit 246 narrows the target band as the channel capacity decreases. For example, the target band determination unit 246 may determine the target band by the following procedure. The target band determination unit 246 obtains a transmittable data size of the waveform data on the basis of the channel capacity and the length of the transmission time of the waveform data corresponding to the terminal uplink signals to be transmitted to the base station 4. The target band determination unit 246 determines the transmittable number of samples by dividing the obtained data size by a data size per sample. The target band determination unit 246 determines a target bandwidth by multiplying the number of samples by a sampling interval of the spectral data. The target band determination unit 246 determines a band having the determined target bandwidth and including a reference frequency as the target band. Note that the target band may be determined in advance on a one-to-one basis with respect to the channel capacity.

The data generation unit 247 generates waveform data by extracting, from the spectral data stored in the storage unit 224, a part related to the target band determined by the target band determination unit 246 at a predetermined sampling interval. The waveform data is represented by, for example, a combination of a value of a frequency and a power value related to the frequency. The transmission data modulation unit 248 converts the waveform data generated by the data generation unit 247 into parallel signals and then modulates the parallel signals. The modulated parallel signals are weighted with the weight issued from the control unit 243 and are transmitted from the respective second antennas 25 as base station downlink signals.

Each terminal station 3 includes a data storage unit 31, a transmission unit 33, and one or a plurality of antennas 34. The data storage unit 31 stores sensor data and the orbit data of the LEO satellite. The transmission unit 33 determines a transmission time period of terminal uplink signals on the basis of the orbit data of the LEO satellite. That is, the transmission unit 33 determines, as the transmission time period of the terminal uplink signals, a time period in which a position where the terminal station 3 exists is present in coverage of the first antennas 21 included in the mobile relay station 2. The transmission unit 33 wirelessly transmits, from the antennas 34, the terminal uplink signals in which the sensor data stored in the data storage unit 31 is set as terminal transmission data.

The transmission unit 33 transmits the signals by, for example, low power wide area (LPWA). Examples of LPWA include LoRaWAN (registered trademark), Sigfox (registered trademark), Long Term Evolution for Machines (LTE-M), and narrowband (NB)-IoT, and an arbitrary wireless communication method can be used. The transmission unit 33 may perform transmission with another terminal station 3 by time-division multiplexing, orthogonal frequency division multiplexing (OFDM), MIMO, or the like. The transmission unit 33 determines a channel to be used by the terminal station to transmit the terminal uplink signals and a transmission timing by a method determined in advance in a wireless communication method to be used. The transmission unit 33 may also perform beam formation of the signals to be transmitted from the plurality of antennas 34 by a method determined in advance in the wireless communication method to be used.

The base station 4 includes a plurality of antenna stations 41, a MIMO receiving unit 42, a base station signal reception processing unit 43, and a terminal signal reception processing unit 44.

Each antenna station 41 is arranged at a position far from another antenna station 41 so as to increase a difference in an angle of arrival of a signal from each of the plurality of second antennas 25 of the mobile relay station 2. Each antenna station 41 converts a base station downlink signal received from the mobile relay station 2 into an electric signal and outputs the electric signal to the MIMO receiving unit 42.

The MIMO receiving unit 42 aggregates the base station downlink signals received from the plurality of antenna stations 41. The MIMO receiving unit 42 stores a weight for each reception time with respect to the base station downlink signal received by each antenna station 41 on the basis of the orbit data of the LEO satellite and the position of each antenna station 41. For example, the reception time may be represented by a time elapsed from a reception start timing. The MIMO receiving unit 42 multiplies the base station downlink signal input from each antenna station 41 by the weight corresponding to the reception time of the base station downlink signal and combines the received signals multiplied by the weights. The same weight may be used regardless of the reception time. The base station signal reception processing unit 43 demodulates and decodes the combined received signal, thereby obtaining demodulation information. The base station signal reception processing unit 43 outputs the demodulation information to the terminal signal reception processing unit 44.

The terminal signal reception processing unit 44 performs reception processing of the terminal uplink signals. The terminal signal reception processing unit 44 includes a terminal signal decoding unit 441. The terminal signal decoding unit 441 decodes a symbol of the terminal uplink signals from the waveform data indicated by the demodulation information, thereby obtaining the terminal transmission data transmitted from the terminal stations 3. In other words, the terminal signal decoding unit 441 decodes the symbol of the terminal uplink signals by converting a frequency domain waveform indicated by the waveform data into a time domain waveform.

An operation of the wireless communication system 1 will be described.

Figure 2:
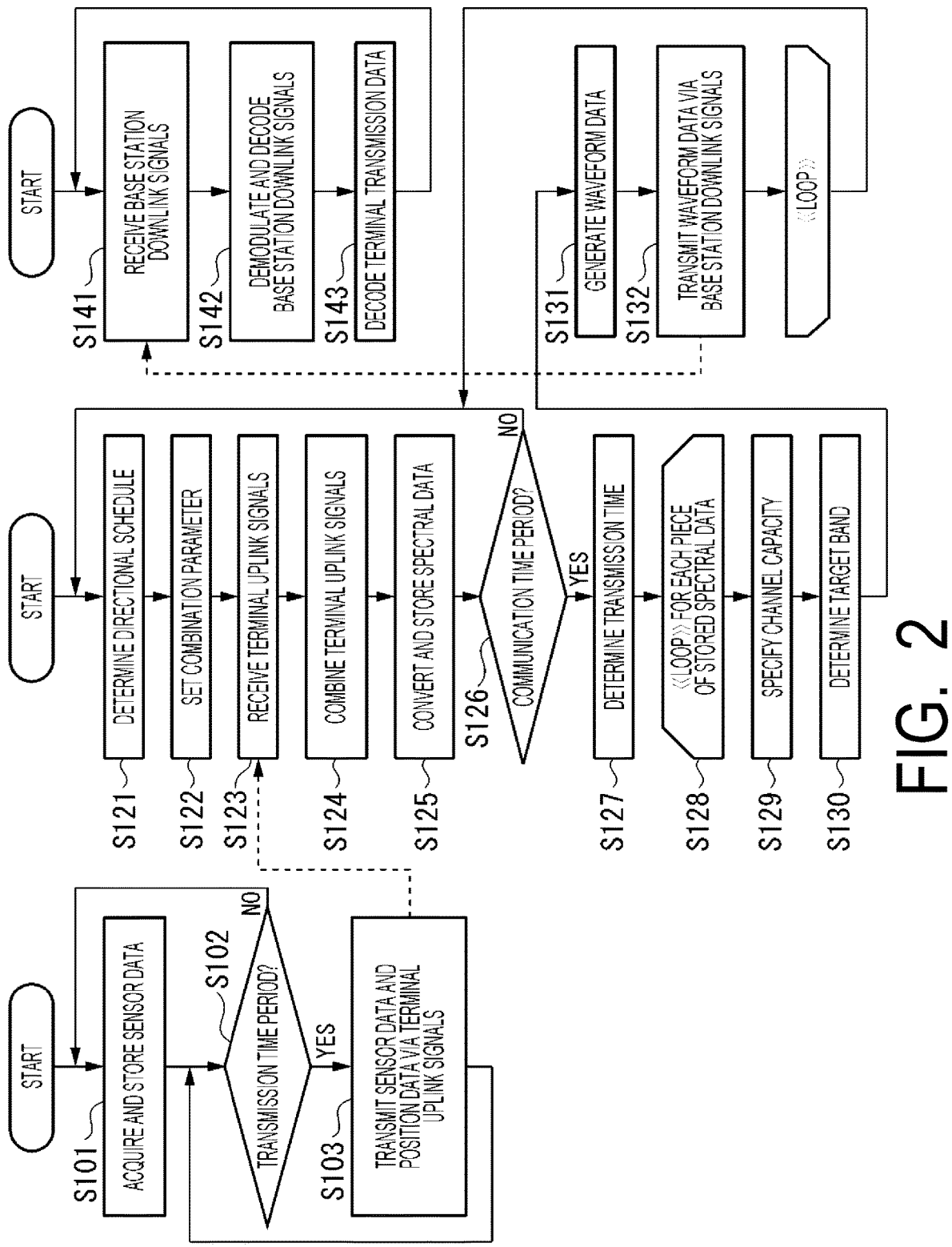
FIG. 2 is a flowchart showing processing of the wireless communication system according to the first embodiment.

FIG. 2 is a flowchart showing processing of the wireless communication system 1 according to the first embodiment. The terminal station 3 acquires data detected by a sensor (not illustrated) provided outside or inside thereof and writes the acquired data to the data storage unit 31 (step S101). The transmission unit 33 determines whether or not a current time is included in a transmission time period of uplink signals on the basis of the position of the terminal station 3 and the orbit data of the LEO satellite (step S102). When the transmission unit 33 determines that the current time is not included in the transmission time period of the uplink signals (step S102: NO), the terminal station 3 returns the processing to step S101.

Meanwhile, when the transmission unit 33 determines that the current time is included in the transmission time period of the uplink signals (step S102: YES), the transmission unit reads the sensor data from the data storage unit 31 and sets the read sensor data to terminal uplink signals as terminal transmission data. The transmission unit 33 wirelessly transmits the terminal uplink signals in which the terminal transmission data is set through the antennas 34 (step S103). The terminal station 3 returns the processing to step S102. Therefore, the terminal station 3 continuously transmits uplink signals during the transmission time period.

The reception schedule determination unit 225 of the mobile relay station 2 determines, for each time, the terminal stations 3 from which the terminal uplink signals are to be received on the basis of the position data of the terminal stations 3 and the orbit data stored in the storage unit 224 (step S121). The parameter determination unit 226 sets the combination parameter of the combining unit 222 at the current time on the basis of the orbit data and the terminal stations 3 from which the terminal uplink signals are to be received determined by the reception schedule determination unit 225 (step S122).

The plurality of receiving units 221 of the mobile relay station 2 receive the terminal uplink signals transmitted from the terminal stations 3 (step S123). Depending on the wireless communication methods of the terminal stations 3 serving as transmission sources, a terminal uplink signal may be received from only one terminal station 3 by time division at the same frequency, or terminal uplink signals may be simultaneously received from a plurality of terminal stations 3 at the same frequency. The combining unit 222 combines the terminal uplink signals received by the plurality of receiving units 221 according to the combination parameter set in step S122 (step S124). The spectrum conversion unit 223 converts the signal combined by the combining unit 222 into spectral data and records the spectral data in the storage unit 224 (step 125).

The transmission schedule determination unit 242 determines whether or not the current time is included in the communication time period with the base station 4 by referring to the storage unit 241 (step S126). When the current time is not included in the communication time period with the base station 4 (step S126: NO), the processing returns to step S121. Meanwhile, when the current time is included in the communication time period with the base station 4 (step S126: YES), the transmission schedule determination unit 242 determines a transmission time of each piece of the waveform data on the basis of the number of pieces of the spectral data stored in the storage unit 224 and the length of the communication time period with the base station 4 (step S127).

The base station communication unit 24 selects the spectral data stored in the storage unit 224 one by one in the transmission order (step S128) and executes the following processing from step S129 to step S131.

The capacity specifying unit 245 specifies the channel capacity in the communication with the base station 4 (step S129). The target band determination unit 246 determines a sampling target band of the spectral data selected in step S128 on the basis of calculation using the length of the transmission time of the waveform data determined in step S127 and the channel capacity specified in step S129 (step S130).

The data generation unit 247 generates waveform data by extracting, from the spectral data selected in step S128, a part related to the target band determined in step S130 at a predetermined sampling interval (step S131).

The transmission data modulation unit 248 performs parallel conversion on the waveform data generated in step S131 and then modulates the waveform data. The MIMO communication unit 244 weights the transmission data modulated by the transmission data modulation unit 248 with the weight issued from the control unit 243 and generates a base station downlink signal to be transmitted from each second antenna 25. The MIMO communication unit 244 transmits each generated base station downlink signal from the second antenna 25 by MIMO during the transmission time period determined in step S127 (step S132).

When transmitting the waveform data related to all pieces of the spectral data stored in the storage unit 224, the mobile relay station 2 returns the processing to step S121.

Each antenna station 41 of the base station 4 receives the base station downlink signal from the mobile relay station 2 (step S141). Each antenna station 41 outputs, to the MIMO receiving unit 42, a received signal that is an electric signal into which the received base station downlink signal has been converted. The MIMO receiving unit 42 synchronizes timings of the received signals received from the respective antenna stations 41. The MIMO receiving unit 42 combines the received signals received by the respective antenna stations 41 on the basis of the weight. The base station signal reception processing unit 43 demodulates the combined received signal (step S142). The base station signal reception processing unit 43 outputs the waveform data obtained by decoding the demodulated received signal to the terminal signal reception processing unit 44.

The terminal signal decoding unit 441 of the terminal signal reception processing unit 44 decodes a symbol of the terminal uplink signals indicated by the waveform data, thereby obtaining the terminal transmission data transmitted from the terminal stations 3 (step S143). Note that the terminal signal decoding unit 441 can also use a decoding method having a large calculation load, such as successive interference cancellation (SIC). The base station 4 repeats the processing from step S141.

According to the first embodiment, the mobile relay station 2 varies the sampling target band of the waveform data on the basis of the channel capacity related to the communication with the terminal stations 3. Specifically, the mobile relay station 2 generates the waveform data such that the target band widens as the channel capacity increases. Therefore, the mobile relay station 2 can effectively use communication resources while preventing missing of received data. In other words, the wireless communication system 1 can transmit information of a wide band in a case where the channel capacity is large.

Second Embodiment

The mobile relay station 2 according to the first embodiment adjusts the data size of the waveform data according to the width of the target band. Meanwhile, a mobile relay station 2 according to a second embodiment adjusts the data size of the waveform data according to a sampling interval.

Figure 3:
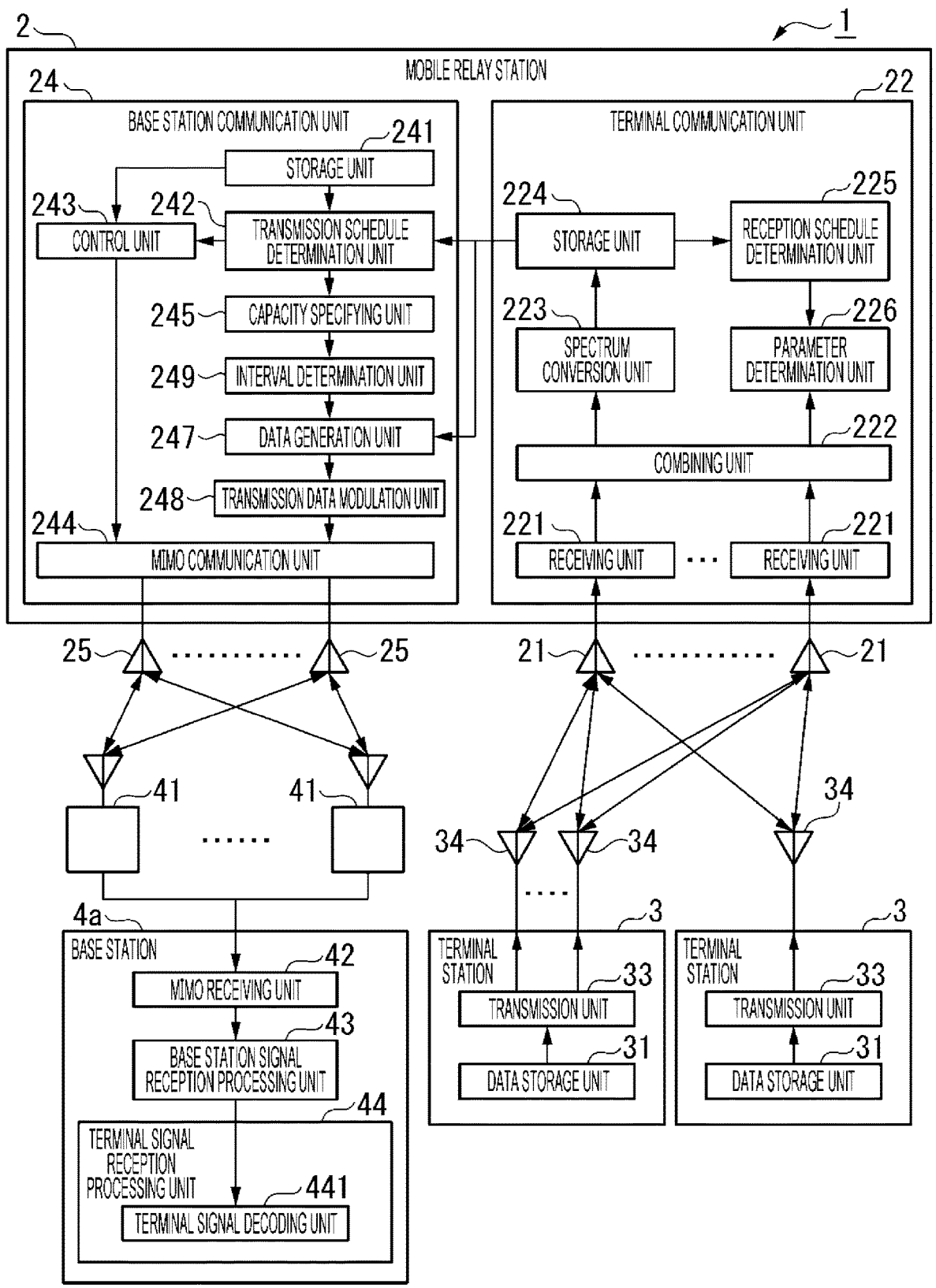
FIG. 3 is a configuration diagram of a wireless communication system according to a second embodiment.

FIG. 3 is a configuration diagram of a wireless communication system 1 according to the second embodiment. The wireless communication system 1 according to the second embodiment is different from the first embodiment in the configuration of the mobile relay station 2. The mobile relay station 2 according to the second embodiment includes an interval determination unit 249 instead of the target band determination unit 246.

The interval determination unit 249 determines a sampling interval of the spectral data stored in the storage unit 224 on the basis of the channel capacity specified by the capacity specifying unit 245. The interval determination unit 249 narrows the sampling interval as the channel capacity increases. Meanwhile, the target band determination unit 246 widens the sampling interval as the channel capacity decreases. For example, the interval determination unit 249 may determine the sampling interval by the following procedure. The interval determination unit 249 obtains the transmittable data size of the waveform data on the basis of the channel capacity and the length of the transmission time of the waveform data corresponding to the terminal uplink signals to be transmitted to the base station 4. The interval determination unit 249 determines the transmittable number of samples by dividing the obtained data size by a data size per sample. The interval determination unit 249 determines the sampling interval by dividing a predetermined sampling target bandwidth by the number of samples. Note that the sampling interval may be determined in advance on a one-to-one basis with respect to the channel capacity.

The interval determination unit 249 may determine the sampling interval so that the logarithmic representation of frequencies to be sampled has a constant interval. That is, the interval determination unit 249 may determine the sampling interval so that, when the data waveform is plotted on a semi-log graph, plots on the frequency axis represented by logarithms have equal intervals.

Figure 4:
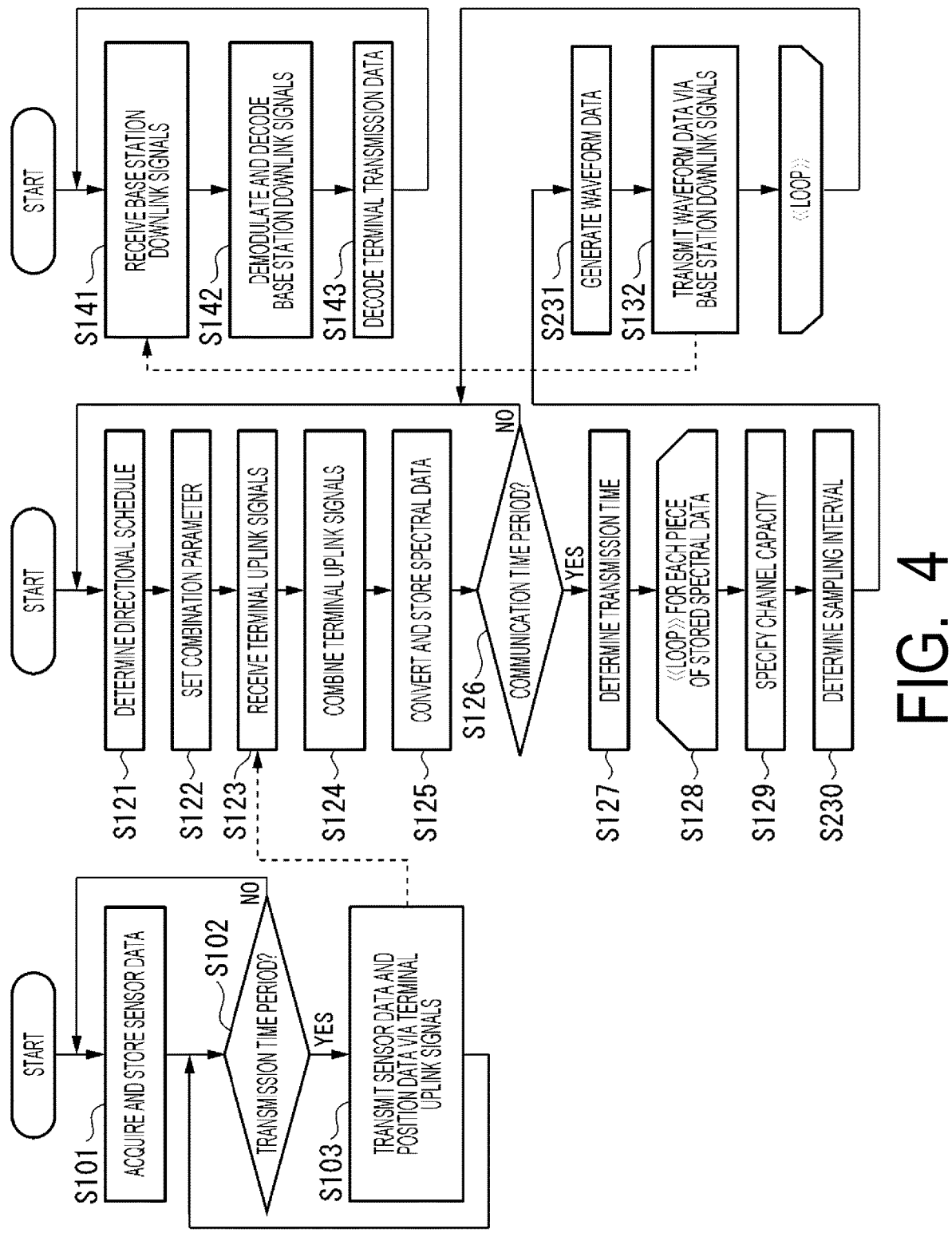
FIG. 4 is a flowchart showing processing of the wireless communication system according to the second embodiment.

FIG. 4 is a flowchart showing processing of the wireless communication system 1 according to the second embodiment. An operation of the wireless communication system 1 according to the second embodiment is partially different from steps in the first embodiment. Specifically, the wireless communication system 1 executes the following steps S230 and S231 instead of steps S130 and S131 according to the first embodiment.

When the capacity specifying unit 245 of the mobile relay station 2 specifies the channel capacity in step S129, the interval determination unit 249 determines a sampling interval of the spectral data selected in step S128 on the basis of calculation using the length of the transmission time of the waveform data determined in step S127 and the channel capacity specified in step S129 (step S230). The data generation unit 247 generates waveform data by extracting, from the spectral data selected in step S128, a part related to a predetermined frequency domain at the sampling interval determined in step S230 (step S231).

The transmission data modulation unit 248 performs parallel conversion on the waveform data generated in step S231 and then modulates the waveform data. The MIMO communication unit 244 weights the transmission data modulated by the transmission data modulation unit 248 with the weight issued from the control unit 243 and generates a base station downlink signal to be transmitted from each second antenna 25. The MIMO communication unit 244 transmits each generated base station downlink signal from the second antenna 25 by MIMO during the transmission time period determined in step S127 (step S132).

According to the second embodiment, the mobile relay station 2 varies the sampling interval of the waveform data on the basis of the channel capacity related to the communication with the terminal stations 3. Specifically, the mobile relay station 2 generates the waveform data such that the sampling interval narrows as the channel capacity increases. Therefore, the mobile relay station 2 can effectively use communication resources while preventing missing of received data. In other words, the wireless communication system 1 can improve accuracy of the waveform to be reproduced by narrowing the sampling interval in a case where the channel capacity is large.

Note that the mobile relay station 2 according to the second embodiment changes the sampling interval according to the channel capacity while fixing a sampling target band, but the present invention is not limited thereto. For example, the mobile relay station 2 according to another embodiment may change both the sampling interval and the sampling target band according to the channel capacity.

As described above, according to the embodiments described above, the mobile relay station 2 generates the waveform data such that the data size increases as the channel capacity related to the communication with the terminal station 3 increases. Therefore, the mobile relay station 2 can effectively use communication resources while preventing missing of received data.

The mobile relay station 2 includes a processor, a memory, an auxiliary storage device, and the like connected by a bus and executes a relay program to function as a device including the terminal communication unit 22 and the base station communication unit 24. Examples of the processor include a central processing unit (CPU), a graphic processing unit (GPU), and a microprocessor.

The relay program may be recorded on a computer-readable recording medium. The computer-readable recording medium is a storage device such as a magnetic disk, a magneto-optical disk, an optical disk, or a semiconductor memory, for example. The relay program may be transmitted via an electrical communication line.

All or some of the functions of the mobile relay station 2 may be implemented by using a custom large scale integrated circuit (LSI) such as an application specific integrated circuit (ASIC) or a programmable logic device (PLD). Examples of the PLD include a programmable array logic (PAL), a generic array logic (GAL), a complex programmable logic device (CPLD), and a field programmable gate array (FPGA). Such an integrated circuit is also included in the examples of the processor.

Other Embodiments

Although embodiments have been described in detail with reference to the drawings, specific configurations are not limited to the above-described configurations, and various design changes and the like can be made thereto. That is, in other embodiments, the order of the above-described processing may be changed as appropriate. Further, part of the processing may be executed in parallel.

The mobile relay station 2 according to the above-described embodiments may be formed by a single computer. Alternatively, the components of the mobile relay station 2 may be separately arranged in a plurality of computers, and the plurality of computers may function as the mobile relay station 2 in cooperation with each other.

According to the embodiments described above, the data generation unit 247 generates the waveform data by sampling the spectral data representing the frequency domain waveform generated by the spectrum conversion unit 223, but the present invention is not limited thereto. For example, the data generation unit 247 according to another embodiment may generate the waveform data by sampling the time domain waveform. In this case, the data generation unit 247 may vary, for example, the sampling interval of the signal combined by the combining unit 222 according to the channel capacity.

The mobile relay station 2 according to the above-described embodiments determines the length of the transmission time of the waveform data according to the number of received terminal uplink signals and determines the data size of the waveform data on the basis of the length of the transmission time, but the present invention is not limited thereto. For example, in the mobile relay station 2 according to another embodiment, the length of the transmission time may be fixed regardless of the number of terminal uplink signals. Further, the mobile relay station 2 according to another embodiment may determine the data size of the waveform data regardless of the length of the transmission time. Even in those cases, the mobile relay station 2 determines the data size of the waveform data at least on the basis of the channel capacity and thus can effectively use the communication resources while preventing missing of the received data.

In the above-described embodiments, the mobile relay station 2 is mounted on the LEO satellite, but the present invention is not limited thereto. For example, the mobile relay station 2 according to another embodiment may be mounted on another flying object such as a geosynchronous satellite, drone, or HAPS. Further, in the above-described embodiments, the mobile relay station 2 moves above the earth, and the terminal stations 3 and the base station 4 are provided on the earth. However, the wireless communication system 1 according to another embodiment may use a celestial body other than the earth, such as the moon.

In the above-described embodiments, the terminal station 3 autonomously specifies a transmission timing of a terminal uplink signal, but other embodiments are not limited thereto. For example, the terminal station 3 according to another embodiment may receive a notification of the transmission timing from the mobile relay station 2 via a beacon signal or the like and transmit the terminal uplink signal according to the transmission timing.

In the embodiments described above, the capacity specifying unit 245 of the mobile relay station 2 specifies the channel capacity related to the communication with the base station 4 by the MIMO communication with the base station 4, but the present invention is not limited thereto. For example, the capacity specifying unit 245 according to another embodiment may store the channel capacity related to the communication with the base station 4 for each time in the storage unit 241 in advance and read the channel capacity from the storage unit 241. Further, the capacity specifying unit 245 according to another embodiment may obtain an angle of elevation between the mobile relay station 2 and the base station 4 on the basis of the orbit data and the position of the base station 4 and estimate the channel capacity on the basis of the angle of elevation.

REFERENCE SIGNS LIST

1 Wireless communication system
2 Mobile relay station
21 First antenna
22 Terminal communication unit
221 Receiving unit
222 Combining unit
223 Spectrum conversion unit
224 Storage unit
225 Reception schedule determination unit
226 Parameter determination unit
24 Base station communication unit
241 Storage unit
242 Transmission schedule determination unit
243 Control unit
244 MIMO communication unit
245 Capacity specifying unit
246 Target band determination unit
247 Data generation unit
248 Transmission data modulation unit
249 Interval determination unit
25 Second antenna
3 Terminal station
31 Data storage unit
33 Transmission unit
34 Antenna
4 Base station
41 Antenna station
42 MIMO receiving unit
43 Base station signal reception processing unit
44 Terminal signal reception processing unit
441 Terminal signal decoding unit

The invention claimed is:

1. A relay device that performs communication while moving, the relay device comprising:
   a receiver configured to receive a signal from a transmission terminal;
   one or more processors configured to perform as:
      a capacity specifying unit configured to specify a channel capacity related to wireless communication with a base station; and
      a data generation unit configured to generate waveform data representing the received signal such that a data size of the waveform data increases as the channel capacity increases; and
   a transmitter configured to transmit the waveform data to the base station.

2. The relay device according to claim 1, wherein the one or more processors are further configured to perform as:
   a spectrum conversion unit configured to convert the signal received from the transmission terminal into a frequency spectrum, wherein
   the data generation unit is configured to generate the waveform data by sampling the frequency spectrum such that a sample size of the frequency spectrum increases as the channel capacity increases.

3. The relay device according to claim 2, wherein the data generation unit is configured to widen a sampling target frequency band in the frequency spectrum as the channel capacity increases.

4. The relay device according to claim 2, wherein the data generation unit is configured to narrow a sampling interval as the channel capacity increases.

5. A relay method comprising:
   receiving a signal from a transmission terminal by a relay device configured to perform communication while moving;
   specifying a channel capacity related to wireless communication with a base station by the relay device;
   generating, by the relay device, waveform data representing the received signal such that a data size of the waveform data increases as the channel capacity increases; and
   transmitting the waveform data to the base station by the relay device.

* * * * *